3,069,329
Patented Dec. 18, 1962

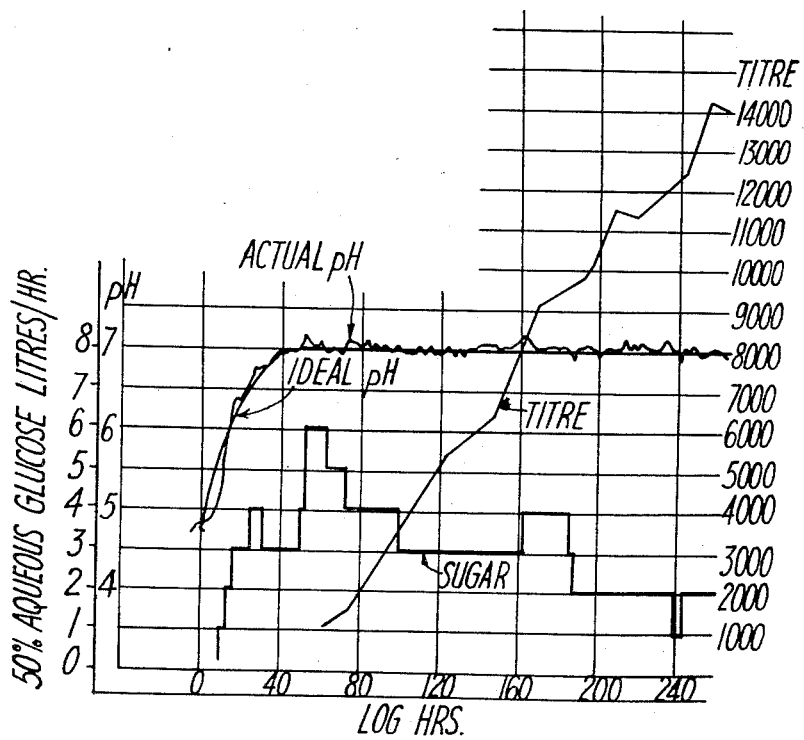

3,069,329
PRODUCTION OF GRISEOFULVIN
Michael John Dorey, Staines, and Ivor L. S. Mitchell, David W. Rule, and Cecile Walker, Ulverston, England, assignors to Glaxo Laboratories Limited, Greenford, England, a British company
Filed May 3, 1961, Ser. No. 107,369
Claims priority, application Great Britain May 4, 1960
18 Claims. (Cl. 195—81)

This invention is concerned with improvements in or relating to the production of the antibiotic griseofulvin.

Griseofulvin, which is an important antifungal antibiotic, may be produced by the culture of various species of the genus Penicillium, and in British Patent No. 784,618 are described methods of conducting such cultures under submerged aerobic conditions more suited to commercial production than the previously described surface culture techniques.

As generally practised hitherto, the submerged aerobic culture of griseofulvin producing organisms to yield griseofulvin has been carried out in media wherein the nitrogen requirements of the organism have been provided by so-called complex organic sources of nitrogen, e.g. various vegetable materials such as corn steep liquor, oatmeal, cottonseed meal etc. or nitrogenous milk products such as whey, the material commonly used being corn steep liquor.

In studies upon the production of griseofulvin by submerged aerobic fermentation, we have found it considerably advantageous to replace part of the complex organic source of nitrogen by ammonia or an ammonium salt. Such replacement apart from substantially improving the fermentation from an economic point of view enables a substantial improvement in titre to be achieved. It thus appears that the inclusion in the medium of ammonia or ammonium salts which are quickly assimilable, as compared with the organic nitrogen sources, can result in a stimulation of growth of the organism in the early stages of the fermentation, and that such stimulation is very beneficial.

According to the invention, therefore, we provide a process for the production of griseofulvin by the submerged aerobic culture of a griseofulvin producing organism in a nutrient medium therefor, the assimilable nitrogen in said medium being provided by at least one complex source of nitrogen and ammonia or an ammonium salt.

The complex organic nitrogenous material may for example be of the type commonly used in fermentation technology, suitable materials being corn steep liquor, cottonseed meal, soya bean meal, penicillin felt, ground nut meal, maize gluten meal, distillers solubles, animal nitrogenous materials such as meat extracts, animal tankage (feathermeal), nitrogen-containing milk products e.g. butter milk, whey powder, liquid whey etc. In general we find that corn steep liquor is the preferred complex source of nitrogen, although particularly advantageous results are obtained by using a mixture of corn steep liquor and distillers solubles. Mixtures wherein the ratio on a nitrogen basis of corn steep liquor to distillers solubles is between 1:4 and 4:1 by weight are satisfactory, mixtures giving equal amounts of nitrogen by weight from both sources being particularly advantageous.

Where an ammonium salt is used it should of course be one, the anion of which is non-toxic to the griseofulvin producing organism. Suitable salts are for example ammonium chloride, ammonium carbonate, ammonium nitrate, ammonium acetate etc. Ammonium sulphate is especially beneficial. It will of course be appreciated that in place of ammonia or an ammonium salt one can use substances giving rise to the presence of ammonia or an ammonium salt in the medium; such substances are for example urea and calcium cyanamide which are converted at least in part to ammonia upon sterilisation of the medium. We have particularly found it convenient to use a mixture of ammonia or an ammonium salt together with urea.

The relative proportions of the two types of nitrogen sources can vary widely; in general we prefer that of the total available nitrogen 5% by weight as N and preferably at least 10% by weight should be constituted by ammonia or an ammonium salt. In general up to some 20% by weight of the total nitrogen (as N) may with advantage be constituted by ammonia or an ammonium salt nitrogen source, but up to 40% by weight and even more may be used. The complex nitrogen source preferably comprises a major proportion (in terms of N) of the total nitrogenous nutrient.

In conducting the fermentation, the medium may be formulated to contain all of the assimilable nitrogen at the beginning of the fermentation, or alternatively some of the nitrogenous material may be added at a later stage. In particular a whole or part of the complex nitrogenous source may be added at a later stage, for example, after the growth of the organism is well developed, e.g. after some 90 hours.

In the obtaining of good results there are, of course, various other factors to which attention must be paid in conducting the production of griseofulvin by submerged fermentation, as discussed generally in our Patent No. 784,618.

In general, however, we prefer to conduct the fermentation in accordance with the procedures described in application No. 10,586, filed February 24, 1960, and now U.S. Patent No. 3,038,839 according to which a nutrient carbohydrate is repeatedly added (continously or batchwise) to the fermentation as it proceeds, in such quantities and at such times that the pH of the medium follows a controlled pH curve as defined in the said specification. By these procedures the culture is initiated at a pH less than 6.6 in a medium poor in nutrient carbohydrate and allowed to proceed until the pH reaches a value between about 6.6 and 7.6. Thereafter the pH of the medium is maintained between 6.6 and 7.6, and preferably 6.8 and 7.2 for the greater part of the fermentation. Suitable carbohydrates include glucose, lactose, sucrose, hydrolysed starch, invert sugar, molasses, invert molasses and starch, of which glucose is preferred.

As discussed in specification No. 784,618, the total level of assimilable nitrogen used in the medium is important. According to the said specification the total assimilable nitrogen should be between 0.04% and 0.3% (of N) and preferably be between 0.075 and 0.25% N. In application No. 107,363, filed May 3, 1961, it is however, shown that provided certain other conditions are also employed, it is possible with advantage to use levels of nitrogen in excess of 0.3% N. In accordance with the present invention it is desirable that the total nitrogen present (as N) i.e. the nitrogen represented by both the complex nitrogenous source and the ammonia or ammonium salt (and urea if used) should lie within the range stated in Patent No. 784,618, unless the conditions described in said application No. 10,586 are also employed, when total levels of nitrogen above 0.3% can with advantage be used.

We have found it advantageous in the present process to include in the medium an assimilable source of sulphur, for which purpose sulphates and thiosulphates, etc. may be used, preferred substances being alkali metal e.g. sodium and potassium sulphates and thiosulphates, as well as sulphuric acid itself. Where ammonium sulphate is used as a source of nitrogen, this substance will, of course, also supply sulphate.

In general the source of sulphur should be included in the medium to provide a level of sulphur (as S) between 0.01% and 0.05% by weight, preferably 0.02–0.04%.

The medium should further desirably contain a water-soluble phosphate, preferably one of an alkali metal, sodium or potassium dihydrogen phosphate being, for example, satisfactory. The phosphate may be present in the medium in an amount, for example, between 0.4 and 0.8% by weight. The medium should further contain a soluble chloride, the amount thereof being at least sufficient to provide the whole of the chlorine in the resulting griseofulvin. Suitable chlorides are the alkali metal chlorides such as sodium and potassium chloride, which are in general preferably used at a level of at least 0.2%, and preferably at least 0.3% by weight. Ammonium chloride is also a useful source of chloride which also of course, acts as a source of nitrogen.

It is also advantageous to have present a methyl donor as described in copending application No. 103,213, filed April 17, 1961, a suitable substance being choline.

It will be understood that the precise proportions in which the various components of the medium are employed to some extent depend on the particular combination of nutrients employed and upon other conditions, e.g. aeration and the design of the fermenter vessel employed.

Various griseofulvin producing species of the genus Penicillium may be used in the process according to the present invention, and in particular those referred to in Patent No. 784,618. The preferred organism is, however, *Penicillium patulum* C.M.I. 39,809: NRRL 989. Apart from the conditions referred to herein, the fermentation is conveniently carried out in accordance with general fermentation practice. Thus the organism is preferably introduced into the production medium as a vegetative inoculum, some 7.5–10% of inoculum being preferably used. The rate of stirring and the rate of aeration in the medium for optimum results vary according to the shape of the fermentation vessel used, and must be determined for the particular vessel in question. Generally it is desirable to initiate the fermentation at lower rates of airflow, which are increased as the fermentation proceeds. Antifoam agents e.g. of the white mineral oil type may be used to control undue foaming action in the medium.

For the better understanding of the invention, the following examples are given by way of illustration only:

EXAMPLE 1

The experiments were carried out in 100 ml. conical flasks containing 30 ml. of medium, shaken on a rotary shaker at 200–220 r.p.m. The standard medium was the corn steep liquor (C.S.L.) medium given below. To the experimental flasks ammonium sulphate was added to give 0.1% nitrogen.

| C.S.L. medium: | Percent w./v. |
|---|---|
| Corn steep liquor nitrogen | 0.15 |
| Lactose | 7.0 |
| $KH_2PO_4$ | 0.4 |
| KCl | 0.25 |
| Lime stone | 0.80 |

The medium was adjusted to pH 5.0 and sterilised at a steam pressure of 15 p.s.i.g. for 20 minutes. The inoculum was developed by seeding spores obtained from a culture of *P. patulum* grown on Czapek-Dox agar into a medium consisting of:

| | Percent w./v. |
|---|---|
| Corn steep liquor nitrogen | 0.30 |
| Sucrose | 2.0 |
| Chalk | 1.0 |

Medium adjusted to pH 6.5 pre-sterilisation.

1.5 ml. of a 48 hour culture was inoculated into the production medium which gave the following titres.

| Treatment | Griseofulvin mgm./l. at days | |
|---|---|---|
| | 7 | 12 |
| $(NH_4)_2SO_4$ as percent Nitrogen: | | |
| 0.0 control | 2,370 | 4,450 |
| 0.1 | 3,270 | 4,790 |

EXAMPLE 2

The stimulatory effect of $(NH_4)_2SO_4$, during the early part of the fermentation, in a C.S.L.: Distillers solubles medium fermented under the same conditions as above, is shown below:

| | Percent w./v. |
|---|---|
| Corn steep liquor nitrogen | 0.075 |
| Dried distillers solubles nitrogen | 0.075 |
| Lactose | 8.00 |
| $KH_2PO_4$ | 0.40 |
| KCl | 0.15 |
| Limestone | 0.80 |

| | Organic $(NH_4)_2SO_4$ | | | Griseofulvin mgm./l. at— | | |
|---|---|---|---|---|---|---|
| | N, percent | N, percent | S, percent | 6 days | 9 days | 13 days |
| Control | 0.15 | 0 | 0.026 | 3,220 | 5,780 | 8,200 |
| | 0.15 | 0.025 | 0.027 | 3,850 | 6,610 | 8,580 |

The control flask sulphur was supplied as 0.1% $Na_2S_2O_3$.

EXAMPLE 3

*The Substitution of Corn Steep Liquor by Ammonium Sulphate or Supplementation of Media Containing the Former With the Latter in 1000 Gallon Stirred Tanks*

Medium:

| | |
|---|---|
| C.S.L. nitrogen | As table and text. |
| Ammon. sulphate nitrogen | Do. |
| $KH_2PO_4$ | 0.40% w./v. |
| KCl | 0.10% w./v. |
| $CaCO_3$ | 0.40% w./v. |
| $H_2SO_4$ | 0.0125% w./v. |
| Pre-inoculation volume | 800 gal. |
| Fermentation temperature | 25° C. |
| Inoculum volume | 10%. |
| Mobilpar S (proprietary antifoam) | 0.0275% w./v. |
| White mineral oil | 0.0275% w./v. |

The experiments were carried out on the 1,000 gallon scale. 3 impellers 1′6″ diameter at 220 r.p.m. were employed. The aeration rates were 0–5 hr., 40 c.f.m., 5–10 hr., 80 c.f.m. and after 10 hr., 125 c.f.m. Pre-inoculation volume 800 gal. The inoculum was grown for about 40 hr. on the following medium:

| | Percent, w./v. |
|---|---|
| Corn steep liquor nitrogen | 0.30 |
| Brown sugar | 2.0 |
| Chalk | 1.0 |
| Maize oil | 1.0 |
| Hodag MF | 0.033 |

This was inoculated with a spore suspension of *Penicillium patulum* (1 litre containing $3-5 \times 10^7$ spores/ml.) and grown at 25°, in an unbaffled 100 gallon tank. It was transferred at 40 hr. and when the mycelial volume after spinning 10 min. at 3,000 r.p.m. was over 25%.

The fermentation was conducted as near to the "ideal" pH curve as possible by addition of crude glucose (50%) containing chloride ($\equiv$1.5% KCl). The accompanying drawing shows the ideal pH curve as well as the actual pH curve and rate of glucose addition (for Experiment 5).

| Exp. | Percent nitrogen, w./v. | | G./l. griseofulvin at— | | | |
|---|---|---|---|---|---|---|
| | As CSL | As ammon. sulphate | 100 hours | 150 hours | 200 hours | 250 hours |
| 5 | 0.35 | 0.05 | 3.4 | 7.0 | 10.7 | 14.0 |
| 6 | 0.40 | 0.00 | 2.8 | 4.8 | 8.1 | 10.7 |
| 3 | 0.30 | 0.025 | 3.0 | 6.9 | 8.9 | 11.7 |
| 4 | 0.30 | 0.05 | 2.1 | 6.2 | 9.5 | 12.9 |
| 1 | 0.25 | 0.0 | 2.4 | 4.9 | 6.0 | 8.0 |
| 2 | 0.25 | 0.025 | 2.6 | 4.8 | 8.0 | 9.5 |

Comparison of Experiments 1 and 2 shows the beneficial effect of ammonium sulphate additional to low levels of C.S.L.

Comparison of Experiments 2 and 3 shows the advantage of raising corn steep liquor further.

Comparison of Experiments 3 and 4 shows the advantage of increasing the ammonium sulphate from 0.025 to 0.05 at a basic level of 0.30% C.S.L. nitrogen.

Comparison of Experiments 5 and 6 shows the benefit of substituting ammonium sulphate for C.S.L. nitrogen at the 0.40% C.S.L. level.

EXAMPLE 4

A medium was devised which consisted of optimal levels of organic nitrogen, ammonium sulphate and urea, sulphur ions, choline chloride, sugar, limestone, potassium phosphate and potassium chloride, as follows:

| | Percent, w./v. |
|---|---|
| Distillers solubles | 0.075 N |
| C.S.L. | 0.075 N |
| $(NH_4)_2SO_4$ | 0.025 N |
| Lactose | 10.0 |
| Choline chloride | 0.1 |
| Limestone | 0.8 |
| $KH_2PO_4$ | 0.4 |
| KCl | 0.3 |

The inoculum development and production stage fermentation techniques used were identical with those used in Example 1. Varying amounts of the corn steep liquor nitrogen in this medium was replaced by urea without any loss in griseofulvin yield, as shown below:

| Percent nitrogen as— | | | | Griseofulvin mgm./l. at— | | |
|---|---|---|---|---|---|---|
| $(NH_4)_2SO_4$ | Dist. sols. | C.S.L. | Urea | 7 days | 10 days | 13 days |
| 0.025 | 0.075 | 0.075 | ---- | 6,015 | 9,750 | 10,655 |
| 0.025 | 0.075 | 0.05 | 0.025 | 6,040 | 9,250 | 9,495 |
| 0.025 | 0.075 | 0.037 | 0.037 | 6,000 | 9,575 | 10,750 |
| 0.025 | 0.075 | 0.025 | 0.050 | 5,890 | 9,560 | 11,140 |
| 0.025 | 0.075 | ---- | 0.075 | 5,970 | 9,120 | 10,740 |

EXAMPLE 5

A similar experiment to those described in Example 3 was conducted on the 1,000 gallon scale with the following combinations of nitrogen sources urea, ammonium sulphate and corn steep liquor. Fermentation control was effected in exactly the same way.

| Percent N as sources | | | g./l. griseofulvin at— | | | |
|---|---|---|---|---|---|---|
| C.S.L. | Urea | Ammonium sulphate | 100 hours | 150 hours | 200 hours | 250 hours |
| 0.35 | 0 | 0.05 | 3.4 | 7.0 | 10.7 | 14.0 |
| 0.30 | 0.05 | 0.05 | 2.0 | 4.3 | 7.8 | 11.1 |
| 0.20 | 0.10 | 0.05 | 3.3 | 6.3 | 9.2 | 13.4 |

EXAMPLE 6

The stimulatory effect on griseofulvin production of ammonium hydroxide is illustrated in this example. The seed development and incubation conditions were as described in Example 1.

| Fermentation medium: | Percent, w./v. |
|---|---|
| Lactose | 10 |
| Limestone | 0.8 |
| $KH_2PO_4$ | 0.4 |
| KCl | 0.3 |
| Choline chloride | 0.1 |

| Percent nitrogen as— | | | | Griseofulvin mgm./l. at— | | |
|---|---|---|---|---|---|---|
| C.S.L. | Dist. sols. | $(NH_4)_2SO_4$ | $NH_4OH$ | 6 days | 9 days | 12 days |
| 0.075 | 0.075 | 0.025 | Nil | 4,690 | 7,380 | 9,790 |
| 0.037 | 0.075 | 0.025 | 0.037 | 4,540 | 7,700 | 10,130 |
| 0.05 | 0.05 | 0.025 | 0.05 | 4,820 | 7,270 | 10,290 |

The pH of media containing ammonium hydroxide was adjusted to 5.0 with hydrochloric acid prior to sterilisation at 121° C. for 20 minutes.

EXAMPLE 7

The use of two ammonium salts is illustrated in this example. Fermentation conditions were as in the previous example.

| Percent nitrogen as— | | | | Griseofulvin mgm./l. at— | | |
|---|---|---|---|---|---|---|
| C.S.L. | Dist. sols. | $(NH_4)_2SO_4$ | $CH_3COONH_4$ | 4 days | 10 days | 13 days |
| 0.075 | 0.075 | 0.025 | Nil | 2,130 | 7,970 | 11,990 |
| 0.05 | 0.05 | 0.025 | 0.05 | 780 | 6,200 | 13,070 |
| 0.037 | 0.075 | 0.025 | 0.037 | 780 | 6,650 | 11,500 |

EXAMPLE 8

Improvements in yield of griseofulvin may be brought about by the addition of a complex nitrogen source during the fermentation. Inoculum was developed as in Example 1. The fermentation medium was prepared as follows:

| | Grams |
|---|---|
| Corn steep liquor nitrogen | 0.0625 N |
| Distillers Solubles nitrogen | 0.0625 N |
| $(NH_4)_2SO_4$ | 0.025 N |
| $KH_2PO_4$ | 0.40 |
| KCl | 0.30 |
| Chalk | 0.80 |
| Lactose | 10.0 |
| Water to 100 ml. | |

The pH was adjusted to 5.0, 30 ml. of medium placed in each of a series of 100 ml. conical flasks and sterilised by heat. After inoculation the flasks were shaken on a rotary shaker at 200–220 r.p.m. During fermentation they received three additions each of 1.5 ml. of medium 1 at 7 and 9 days and one or two additions of 1.5 ml. medium 2.

| Medium 1: | Grams |
|---|---|
| Lactose | 50 |
| Potassium chloride | 1 |
| Water to 100 ml. | |

| Medium 2: | Grams |
|---|---|
| Distillers solubles—Nitrogen | 0.5 |
| Corn steep liquor—Nitrogen | 0.5 |
| Water to 100 ml. | |

| Treatment | | Griseofulvin mg./l. at— | |
|---|---|---|---|
| Medium 2 added at (days) | Total nitrogen, percent | 7 days | 12 days |
| 0 | 0.15 | 5,806 | 11,700 |
| 7 | 0.20 | 5,676 | 11,684 |
| 7, 9 | 0.25 | 6,089 | 11,628 |
| 7, 9 | 0.30 | 5,903 | 11,425 |

We claim:
1. In a process for the production of griseofulvin by the submerged aerobic culture of a griseofulvin producing organism in a nutrient medium therefor containing assimilable nitrogen, the improvement of providing said assimilable nitrogen in said medium by including therein at least one complex organic source of nitrogen and at least one member of the group consisting of ammonia and an ammonium salt.

2. A process as claimed in claim 1 in which the complex organic nitrogenous material is selected from the group consisting of corn steep liquor, cottonseed meal, soya bean meal, penicillin felt, ground nut meal, maize gluten meal, distillers solubles, meat extract, animal tankage and a nitrogen-containing milk product.

3. A process as claimed in claim 1 in which the complex organic nitrogenous material is a mixture of corn steep liquir and distillers solubles.

4. A process as claimed in claim 3 in which the ratio of corn steep liquir to distillers solubles on a nitrogen basis is within the range of from 1:4 to 4:1 by weight.

5. A process as claimed in claim 3 in which the ratio of corn steep liquor to distillers solubles on a nitrogen basis is 1:1 by weight.

6. A process as claimed in claim 1 in which the medium includes ammonium sulphate.

7. A process as claimed in claim 1 in which at least 5% by weight of the total available nitrogen in terms of nitrogen in the medium is constituted by the member selected from the group consisting of ammonia and ammonium salt.

8. A process as claimed in claim 7 in which at least 10% by weight of the total available nitrogen in terms of nitrogen is constituted by the member selected from the group consisting of ammonia and ammonium salt.

9. A process as claimed in claim 1 in which the complex organic nitrogen source constitutes a major proportion in terms of nitrogen of the total nitrogenous nutrient.

10. A process as claimed in claim 1 in which 10–20% by weight of the total nitrogenous source in terms of nitrogen is constituted by the member selected from the group consisting of ammonia and ammonium salt.

11. A process as claimed in claim 1 in which the medium also contains urea.

12. A process as claimed in claim 1 in which at least part of the complex organic nitrogen source is added after the growth of the organism is well developed.

13. A process as claimed in claim 1 in which the medium also contains an assimilable source of sulphur.

14. A process as claimed in claim 13 in which the source of sulphur is selected from the group consisting of a sulphate, thiosulphate and sulphuric acid.

15. A process as claimed in claim 13 in which the source of sulphur is included in the medium in a quantity sufficient to provide a level of sulphur in terms of sulphur of from 0.01–0.05% by weight.

16. A process as claimed in claim 15 in which the source of sulphur is included in the medium in a quantity sufficient to provide a level of sulphur in terms of sulphur of from 0.02–0.04% by weight.

17. A process as claimed in claim 1 in which the medium also contains a methyl donor.

18. A process for the production of griseofulvin by the submerged aerobic culture of a griseofulvin producing organism which comprises initiating the culture at a pH less than 6.6 in a medium poor in nutrient carbohydrate, allowing the culture to proceed until the pH reaches a value between about 6.6 and 7.6 and thereafter repeatedly adding nutrient carbohydrate to the medium in such quantities at such times that the pH remains between about 6.6 and 7.6, said medium being provided with assimilable nitrogen by including therein at least one complex organic source of nitrogen and at least one member selected from the group consisting of ammonia and an ammonium salt.

References Cited in the file of this patent
UNITED STATES PATENTS
2,843,527    Rhodes et al. _____ July 15, 1958